United States Patent
Yumoto et al.

(10) Patent No.: US 8,906,477 B2
(45) Date of Patent: Dec. 9, 2014

(54) RECORDING MEDIUM

(71) Applicant: Canon Kabushiki Kaisha, Tokyo (JP)

(72) Inventors: Shinya Yumoto, Kawasaki (JP); Yasuhiro Nito, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/181,362

(22) Filed: Feb. 14, 2014

(65) Prior Publication Data

US 2014/0234559 A1 Aug. 21, 2014

(30) Foreign Application Priority Data

Feb. 19, 2013 (JP) ................. 2013-030121

(51) Int. Cl.
*B41M 5/00* (2006.01)
*B41M 5/52* (2006.01)
*B41M 5/50* (2006.01)
*B32B 3/10* (2006.01)

(52) U.S. Cl.
CPC .............. *B41M 5/5218* (2013.01); *B41M 5/508* (2013.01); *B41M 5/506* (2013.01); *B32B 3/10* (2013.01); *B41M 5/502* (2013.01)
USPC ................... 428/32.24; 428/32.25; 428/32.26; 428/32.31; 428/201; 428/206; 428/213; 428/215

(58) Field of Classification Search
CPC ...... B41M 5/506; B41M 5/502; B41M 5/508; B41M 5/5218; B32B 3/10
USPC ............. 428/32.24, 32.25, 32.26, 32.31, 201; 428/206, 213, 215
See application file for complete search history.

(56) References Cited

U.S. PATENT DOCUMENTS

| 6,465,086 B1 * | 10/2002 | Kitamura et al. .......... 428/32.25 |
| 2001/0016249 A1 * | 8/2001 | Kitamura et al. ............. 428/195 |
| 2003/0072925 A1 * | 4/2003 | Kiyama et al. ................ 428/195 |
| 2004/0152819 A1 * | 8/2004 | Cuch ............................ 524/430 |

FOREIGN PATENT DOCUMENTS

| JP | 2001096898 A | 4/2001 |
| JP | 2004237485 A | 8/2004 |
| JP | 2008183807 A | 8/2008 |

* cited by examiner

*Primary Examiner* — Betelhem Shewareged
(74) *Attorney, Agent, or Firm* — Canon U.S.A., Inc. IP Division (57) ABSTRACT

A recording medium includes a substrate and ink receiving layers including a first ink receiving layer and a second ink receiving layer in that order. The first ink receiving layer contains first inorganic particles including alumina and silica particles, and a first binder. In the first ink receiving layer, the mass ratio of the first binder to the first inorganic particles is from 0.13 to 0.33, and the mass ratio of the alumina particles to the silica particles is from 0.43 to 2.33. The second ink receiving layer contains second inorganic particles and a second binder. The mass ratio of the second binder to the second inorganic particles is from 0.05 to 0.30. The second ink receiving layer has a thickness from 2 μm to 10 μm, and the total thickness of ink receiving layers is from 10 μm to 30 μm.

4 Claims, 1 Drawing Sheet

RECORDING MEDIUM

BACKGROUND OF THE INVENTION

1. Field of the Invention

The present invention relates to a recording medium.

2. Description of the Related Art

Ink jet recording techniques are being applied to the field of commercial printing, particularly with growing demand for photo books and photo albums. Photo books and photo albums are typically in a center-folded form that is made by folding in half each recording medium on which images or other information have been recorded, and bonding the folded media together. In the production of such a photo book or photo album, when image-recorded media are each folded, the images are liable to be cracked along the fold line (this phenomenon is hereinafter referred to as fold cracking). Accordingly, recording media used in the field of commercial printing is required to have high resistance to fold cracking (hereinafter referred to as hold crack resistance), in addition to the characteristics generally required of recording media, such as high the characteristics of exhibiting high ink absorbency when high-speed recording is performed and of providing high color developability to the recorded image.

One of the approaches for preventing cracking at the surface of a recording medium is to increase the flexibility of the recording medium. Japanese Patent Laid-Open Nos. 2004-237485, 2001-096898 and 2008-183807 disclose methods for increasing the flexibility of a recording medium. Japanese Patent Laid-Open No. 2004-237485 discloses a recording medium including an ink receiving layer containing a resin emulsion. The resin emulsion forms fine pores in the ink receiving layer, thereby increasing the flexibility of the recording medium. In the recording medium disclosed in Japanese Paten Laid-Open No. 2001-096898, an underlying support layer containing a water-soluble resin is provided between a substrate and an ink receiving layer to increase the flexibility of the recording medium. Japanese Patent Laid-Open No. 2008-183807 discloses a recording medium including an intermediate layer containing a resin having a glass transition temperature of 50° C. or less between a substrate and an ink receiving layer.

SUMMARY OF THE INVENTION

The present invention provides a recording medium that has a high ink absorbency and exhibits high color developability when images are recorded, and is also highly resistant to fold cracking.

According to an aspect of the invention, a recording medium is provided which includes a substrate and ink receiving layers including a first ink receiving layer and a second ink receiving layer in that order. The first ink receiving layer contains first inorganic particles including alumina particles and silica particles, and a first binder. The mass ratio of the first binder to the first inorganic particles in the first ink receiving layer is 0.13 or more and 0.33 or less, and the mass ratio of the alumina particles to the silica particles in the first ink receiving layer is 0.43 or more and 2.33 or less. The second ink receiving layer contains second inorganic particles and a second binder. The mass ratio of the second binder to the second inorganic particles in the second ink receiving layer is 0.05 or more and 0.30 or less. The second ink receiving layer has a thickness of 2 µm or more and 10 µm or less, and the total thickness of ink receiving layers is 10 µm or more and 30 µm or less.

Further features of the present invention will become apparent from the following description of exemplary embodiments with reference to the attached drawing.

DESCRIPTION OF THE EMBODIMENTS

Figure 1:
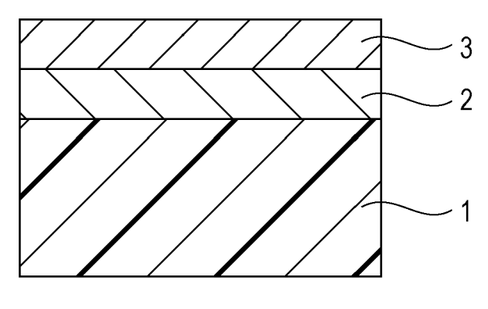
FIGURE is a schematic sectional view of a recording medium according to an embodiment of the present invention.

The present invention will be further described using exemplary embodiments.

The techniques for increasing the flexibility of a recording medium disclosed in the above-cited patent documents allow merely for a fold formed during handling the recording medium, as is clear from the description in the Examples in the patent documents, in any of which the flexibility was evaluated in a state where the recording medium was wound around a cylindrical bar. In other words, these techniques do not think of the case where image-recorded recording media are folded as in a process for making a photobook or an album.

Indeed, the present inventors formed fold lines in the recording media of the above-cited disclosures. As a result, white lines along the fold line were observed in the images on the recording media. Thus, the recording media disclosed in Japanese Patent Laid-Open Nos. 2004-237485, 2001-096898 and 2008-183807 did not exhibit sufficient fold crack resistance.

The present inventors found through their study that the white line along a fold line of an image-recorded medium is a white background that has not absorbed ink, such as part of the substrate or a portion of the ink receiving layer adjacent to the substrate, exposed by removal of or cracking in a portion in which ink has been absorbed. Accordingly, the present inventors thought that the occurrence of a white line can be reduced not only by increasing the flexibility of the recording medium as in the known approach, but also by applying to the recording medium something to make the white background hard to see even when fold cracking occurs.

In order to make the white background hard to see, the present inventors paid their attention to the technique of producing, on purpose, haze that is generally considered to be a technical problem in the art. The term "haze" mentioned herein refers to the phenomenon in which images are seen as if they were covered with mist. The present inventors found through their research that haze can be produced by combined use of alumina particles and silica particles as inorganic particles. This is probably because alumina particles and silica particle have different refractive indexes, and because light is scattered by pores formed by the aggregation of these inorganic particles. In addition, it has been found that the pores alleviate the stress placed on the recording medium when it is folded, thus increasing the flexibility of the recording medium.

Then, the present inventors found that it is effective to use alumina particles and silica particles in a specific ratio (mass ratio of the alumina particles to the silica particle: 0.43 to 2.33) with a binder in a specific ratio to the inorganic particles (mass ratio of the binder to the inorganic particles: 0.13 to 0.33) in the ink receiving layer. When these conditions are satisfied, the binder and the pores formed by the combined use of alumina particles and silica particles act synergistically to relieve the stress placed by folding the recording medium and produce haze, and consequently, the obtained recording medium can exhibit an enhanced hold crack resistance and a high ink absorbency.

For a recording medium including only one of the ink receiving layer, however, images recorded on the recording medium do not have satisfactory color developability although the fold crack resistance and ink absorbency of the recording medium are improved. This is probably because the haze produced as described above makes images seen as if they were covered with mist.

Accordingly, the present inventors formed another ink receiving layer (second ink receiving layer) having specific features over the above-described ink receiving layer (first ink receiving layer), and found that both the color developability of the recorded image and the fold crack resistance of the recording medium were improved. In this recording medium, the second ink receiving layer rapidly absorbs ink to retain the color material in the ink, and the first ink receiving layer underlying the second ink receiving layer produces haze. This is a structure in which haze is produced under the image when viewed from above, and, therefore, the structure can prevent the adverse effect of the haze to degrade the color developability of the recorded image. The features of the second ink receiving layer will now be described below.

The present inventors found through their studies that the second ink receiving layer is required to contain a binder (hereinafter referred to as second binder to differentiate it from the first binder in the first ink receiving layer) in a specific ratio to the inorganic particles (hereinafter referred to as second inorganic particles to differentiate them from the first inorganic particles in the first ink receiving layer) such that the second binder content is lower than the second inorganic particle content (mass ratio of the second binder to the second inorganic particles is 0.05 to 0.30), and to have a thickness of 2 μm or more and 10 μm or less.

If the ratio of the second binder content to the second inorganic particle content in the second ink receiving layer is more than 0.30, the recording medium exhibits low ink absorbency.

If the ratio of the second binder content to the second inorganic particle content in the second ink receiving layer is less than 0.05, the coating of the ink receiving layer is liable to crack and result in a nonuniform ink receiving layer. Thus, the second ink receiving layer cannot produce the effect of increasing the color developability of the recorded image.

Also, if the thickness of the second ink receiving layer is less than 2 μm, the second ink receiving layer is liable to be affected by the haze produced from the first ink receiving layer, and the recorded image exhibits low color developability. In contrast, if the thickness of the second ink receiving layer is larger than 10 μm, the first ink receiving layer cannot efficiently produce the effect of relieving the stress placed by folding the recording medium, and results in a low fold crack resistance.

Furthermore, the present inventors found that the total thickness of the ink receiving layers also may influence the fold crack resistance of the recording medium. More specifically, for an ink receiving layer containing specific materials in a specific proportion, as the thickness of the ink receiving layer is increased, the occurrence of fold cracking decreases. However, once fold cracking occurs, the width of the crack (width of the white line) increases, and thus the white background becomes liable to be visible.

Accordingly, by controlling the total thickness of the first ink receiving layer and the second ink receiving layer to a relatively small thickness such as 10 μm to 30 μm in addition to the above-described conditions, cracks produced by fold cracking are likely to be invisible while the ink absorbency of the recording medium and the color developability of the recorded image are maintained. Thus, the fold crack resistance of the recording medium can be further enhanced.

Synergistic interaction among components or members of the recording medium produces advantageous effects as expected, as described above.

Recording Medium

The recording medium of an embodiment of the present invention includes a substrate, a first ink receiving layer, and a second ink receiving layer in that order. An exemplary structure of the recording medium is described with reference to FIGURE. The recording medium shown in FIGURE includes a substrate 1, a first ink receiving layer 2, and a second ink receiving layer 3. In the embodiment shown in FIGURE, the recording medium may be intended for use in ink jet recording. Each component of the recording medium will be described.

Substrate

The substrate may be composed of a base paper, or may include a base paper and a resin layer (a base paper coated with a resin). In an embodiment, it is advantageous that the substrate includes a base paper and a resin layer. By coating a base paper with a resin, the flexibility of the recording medium is increased to improve the fold crack resistance, and, in addition, permeation of water from ink to the substrate is reduced to prevent cockling. Although the substrate may be provided with the resin layer only over the surface of the substrate on which the ink receiving layers are formed, it is advantageous that both sides of the substrate are coated with the resin layer.

The base paper is mainly made of wood pulp, and may optionally contain a synthetic pulp such as polypropylene, or a synthetic fiber such as nylon or polyester. Exemplary wood pulp include leaf bleached kraft pulp (LBKP), leaf bleached sulfite pulp (LBSP), needle bleached kraft pulp (NBKP), needle bleached sulfide pulp (NBSP), leaf dissolving pulp (LDP), needle dissolving pulp (NDP), leaf unbleached kraft pulp (LUKP), and needle unbleached kraft pulp (NUKP). These wood pulps may be used singly or in combination. LBKP, NBSP, LBSP, NDP and LDP, which contain short fiber components, are advantageous. Pure chemical pulp is also advantageous such as sulfate pulp or sulfite pulp. Pulps bleached to increase the whiteness are also advantageous. The base paper may further contain a sizing agent, a white pigment, a reinforcing agent, a fluorescent brightening agent, a moisturizing agent, a dispersant, or a softening agent, if necessary.

The base paper has a basis weight preferably of 50 $g/m^2$ or more and 250 $g/m^2$ or less, and more preferably 70 $g/m^2$ or more and 200 $g/m^2$ or less. The thickness of the base paper can be 50 μm or more and 350 μm or less. The base paper may be planarized by calendaring during or after paper making. The density of the base paper specified in JIS P 8118 is preferably 0.6 $g/cm^3$ or more and 1.2 $g/cm^3$ or less. The stiffness of the base paper specified in JIS P 8143 is preferably 20 g or more and 200 g or less. Also, the pH of the base paper specified in JIS P 8113 is preferably 5 or more and 9 or less.

In an embodiment of the present invention, if the substrate includes a resin layer, the thickness of the resin layer is preferably 5 μm or more and 40 μm or less. More preferably, it is 8 μm or more and 35 μm or less. The thickness of the resin layer mentioned herein is determined by the following procedure. First, the recording medium is cut to expose a section with a microtome, and the section is observed by scanning electron microscopy. The thickness of the section is measured at arbitrarily selected 100 points or more, and the average of the measured thicknesses is defined as the thickness of the resin layer. The thicknesses of other layers can be determined in the same manner.

The resin layer can be made of a thermoplastic resin. Examples of the thermoplastic resin include acrylic resin, acrylic silicone resin, polyolefin resin, and styrene-butadiene copolymer. Among these, polyolefin resin is advantageous. The polyolefin resin mentioned herein refers to a polymer using an olefin as a monomer. More specifically, the polyolefin resin may be a homopolymer or copolymer containing one or more monomers such as ethylene, propylene, and isobutylene. The polyolefin resin may be a single compound or include two or more polyolefins. Among polyolefins, polyethylene is advantageous. The polyethylene may be a low density polyethylene (LDPE) or a high density polyethylene (HDPE). The resin layer may contain a white pigment, a fluorescent brightening agent or ultramarine blue to adjust opacity, whiteness or hue. In particular, a white pigment is effective in enhancing the opacity of the recording medium. The white pigment may be titanium oxide in the form of rutile or anatase.

Ink Receiving Layers

In an embodiment of the present invention, the recording medium includes at least two ink receiving layers, which are called the first ink receiving layer and the second ink receiving layer in that order from the substrate. Another ink receiving layer may be provided between the substrate and the first ink receiving layer, between the first ink receiving layer and the second ink receiving layer, or over the second ink receiving layer. Alternatively, ink receiving layers may be provided at both sides of the substrate. Each ink receiving layer can be formed by applying an ink receiving layer coating liquid over the substrate.

The total thickness of the ink receiving layers including the first and second ink receiving layers is 10 μm or more and 30 μm or less. The total thickness of the ink receiving layers mentioned herein refers to the sum of the thicknesses of all the ink receiving layers of the recording medium. The thickness of the first ink receiving layer can be 5 μm or more and 28 μm or less. The thickness of the second ink receiving layer is 2 μm or more and 10 μm or less, as described above.

In addition, from the viewpoint of achieving a recording medium having a high fold crack resistance, the thickness of the second ink receiving layer is twice or less the thickness of the first ink receiving layer.

The materials of the ink receiving layers will now be described.

First Ink Receiving Layer (1) Inorganic Particles

The first ink receiving layer contains both of alumina particles and silica particles as inorganic particles (first inorganic particles).

The inorganic particle content of the first ink receiving layer can be 50% by mass or more and 88% by mass or less, and is preferably 65% by mass or more and 86% by mass or less.

(1-1) Alumina Particles

In an embodiment of the present invention, the alumina particles mentioned herein refers to particles containing alumina. More specifically, the alumina particles may be particles of hydrated alumina or alumina produced by a gas phase process (hereinafter referred to as fumed alumina). The first ink receiving layer preferably contains at least one selected from hydrated alumina and fumed alumina.

(1-1-1) Hydrated Alumina

The hydrated alumina may be expressed by the following general formula (X): $Al_2O_{3-n}(OH)_{2n} \cdot mH_2O$ (n represents 0, 1, 2, or 3, m represents a number of 0 to 10, preferably 0 to 5, and m and n are not simultaneously set to 0). In general formula (X), $mH_2O$ represents a desorbable aqueous phase that is often not involved in the formation of crystal lattices, and m is not necessarily integer. Also, m can be brought to 0 by heating hydrated alumina.

The hydrated alumina can be produced in a known process. More specifically, the hydrated alumina can be produced by hydrolysis of aluminum alkoxide, by hydrolysis of sodium aluminate, or by adding an aqueous solution of aluminum sulfate or aluminum chloride to a sodium aluminate aqueous solution to neutralize the sodium aluminate solution.

The hydrated alumina may be amorphous or may have a crystal structure in the form of gibbsite or boehmite, depending on the temperature of heat treatment. The crystal structure of the hydrated alumina can be analyzed by X-ray diffraction. The hydrated alumina used in an embodiment can be amorphous or in the form of boehmite. Examples of the hydrated alumina include hydrated alumina disclosed in Japanese Patent Laid-Open Nos. 7-232473, 8-132731, 9-66664 and 9-76628, and commercially available hydrated alumina such as Disperal series HP 10, HP 14, and HP 18 (each produced by Sasol). These types of hydrated alumina may be used singly or in combination.

The specific surface area of the hydrated alumina particles, determined by the BET method, is preferably 100 m$^2$/g or more and 200 m$^2$/g or less, more preferably 125 m$^2$/g or more and 190 m$^2$/g or less. In the BET method, molecules or ions having a known size are adsorbed to the surfaces of a sample, and the specific surface area of the sample is calculated from the amount of adsorbed molecules or ions. In an embodiment of the present invention, for adsorbing molecules or ions, nitrogen gas is used.

The particles of the hydrated alumina can have a plate-like shape. The plate-like hydrated alumina particles may have an average aspect ratio of 3.0 or more and 10 or less. This aspect ratio refers to the ratio of the average primary particle size of the plate-like hydrated alumina particles to the average thickness of the hydrated alumina particles. This average thickness is the number average thickness of 10 hydrated alumina particles arbitrarily selected through an electron microscope. Also, the particle size of the plate-like particles can be such that the ratio of the smallest particle size to the largest particle size is 0.60 or more and 1.0 or less.

(1-1-2) Alumina Produced by Gas Phase Process (Fumed Alumina)

Fumed alumina may be γ-alumina, α-alumina, δ-alumina, θ-alumina, or χ-alumina. From the viewpoint of the optical density of the image and the ink absorbency, γ-alumina can be advantageously used. Examples of the fumed alumina include AEROXIDE series Alu C, Alu 130, and Alu 65 (each produced by EVONIK).

In an embodiment of the present invention, the specific surface area of the fumed alumina particles measured by the BET method can be 50 m$^2$/g or more and is preferably 80 m$^2$/g or more. Also, it can be 150 m$^2$/g or less and is preferably 120 m$^2$/g or less.

The average primary particle size of the fumed alumina particles can be 5 nm or more and is preferably 11 nm or more. Also, it can be 30 nm or less and is preferably 15 nm or less.

(1-1-3) Deflocculating Acid

The hydrated alumina particles used in an embodiment can be dispersed in the ink receiving layer coating liquid and thus can be used in the form of dispersion liquid. For dispersing the alumina particles, a deflocculating acid may be used. The deflocculating acid may be a sulfonic acid expressed by the following general formula (Y): R—SO$_3$H.

In general formula (Y), R represents hydrogen, an alkyl group having a carbon number of 1 to 3, or an alkenyl group having a carbon number of 1 to 3, and R may be substituted with an oxo group, a halogen atom, an alkoxy group, or an acyl group. Such a sulfonic acid can minimize bleeding in the recorded image. The ratio of the deflocculating acid to the alumina particles can be 1.0% by mass or more and 2.0% by mass or less and is preferably 1.3% by mass or more and 1.6% by mass or less.

(1-2) Silica Particles

The silica particles mentioned herein refers to particles containing silica. More specifically, the silica particles may be particles of silica produced by a gas phase process or a wet process. The first ink receiving layer used in an embodiment may contain at least either silica produced by a gas phase process (hereinafter referred to as fumed silica) or silica produced by a wet process (hereinafter referred to as wet process silica).

The silica that can be used in the ink receiving layers is roughly classified into two types: wet process silica and dry process (gas phase process) silica by the production process. In a known wet process, a silicate is decomposed into active silica by an acid, and the active silica is polymerized to an appropriate extent and then precipitated by aggregation to yield hydrous silica. The wet process silica whose primary particles can be present in a monodisperse state is referred to as colloidal silica. In a known dry process (gas phase process), anhydrous silica is produced by high temperature gas phase hydrolysis (flame hydrolysis) of a silicon halide, or a process (arc process) in which silica sand is heated to be reduced with coke and evaporated by arc in an electric furnace, and the evaporated gas phase is oxidized with air. In an embodiment of the present invention, fumed silica is advantageous.

Fumed silica particles have particularly large specific area and accordingly can exhibit high ink absorbency. In addition, since fumed silica has a low refractive index, it can impart transparency to the ink receiving layer, and consequently, the recorded image exhibits good color developability. Examples of the fumed silica include AEROSIL (produced by Nippon Aerosil) and Reolosil QS series (produced by Tokuyama).

The specific surface area of the fumed silica particles determined by the BET method can be 50 $m^2/g$ or more and 400 $m^2/g$ or less, and is preferably 200 $m^2/g$ or more and 350 $m^2/g$ or less.

In an embodiment of the present invention, the fumed silica can be dispersed in the ink receiving layer coating liquid and thus can be used in the form of dispersion liquid. The fumed silica particles in a dispersion can have a particle size of 50 nm or more and 300 nm or less. The particle size of the fumed silica in a dispersion can be measured by dynamic light scattering.

(1-3) Mass Ratio of Alumina Particles to Silica Particles

In the first ink receiving layer of an embodiment, the mass ratio of the alumina particles to the silica particles is 0.43 or more and 2.33 or less, as described above. Preferably, it is 0.67 or more and to 1.50 or less.

(2) Binder

The first ink receiving layer contains a binder (first binder). The term binder refers to a material that can bind inorganic particles together to form a coating.

Examples of the binder include starch derivatives, such as oxidized starch, etherified starch, and phosphoric acid-esterified starch; cellulose derivatives, such as carboxymethyl cellulose and hydroxyethyl cellulose; casein, gelatin, soy protein, polyvinyl alcohol (PVA), and derivatives thereof; conjugated polymer latex, such as polyvinyl pyrrolidone, maleic anhydride resin, styrene-butadiene copolymer, and methyl methacrylate-butadiene copolymer; acrylic polymer latex, such as polymers of an acrylic ester and a methacrylic ester; vinyl polymer latex, such as ethylene-vinyl acetate copolymer; functional group-modified polymer latex of monomers having a functional group such as the carboxy group of the above polymers; products produced by cationizing the above-mentioned polymers with a cationic group; products produced by cationizing the surface of any of the above-mentioned polymers with a cationic surfactant; polymers having surfaces to which polyvinyl alcohol molecules are distributed, produced by polymerizing any of the above-mentioned polymers in the presence of a cationic polyvinyl alcohol; polymers having surfaces to which cationic colloid particles are distributed, produced by polymerizing any of the above-mentioned polymers in a cationic colloid particles-suspended dispersion liquid; thermosetting synthesized resins, such as melamine resin and urea resin; polymers and copolymers of methacrylic esters and acrylic esters, such as polymethyl methacrylate; and other synthetic resins such as polyurethane resin, unsaturated polyester resin, vinyl chloride-vinyl acetate copolymer, polyvinyl butyral, and alkyd resin. These binders may be used singly or in combination.

Among these binders, polyvinyl alcohol and its derivatives are advantageous. Exemplary polyvinyl alcohol derivatives include cation-modified polyvinyl alcohols, anion-modified polyvinyl alcohols, silanol-modified polyvinyl alcohols, and polyvinyl acetal.

Polyvinyl alcohol can be synthesized by saponifying polyvinyl acetate. The saponification degree of the polyvinyl alcohol can be 80% by mole or more and 100% by mole or less, and is preferably 85% by mole or more and 100% by mole or less. A saponification degree represents the proportion of the amount by mole of the hydroxy group produced by saponification reaction to the polyvinyl alcohol produced by saponifying a polyvinyl acetate. In the following description, a saponification degree refers to a value measured by the method specified in JIS K 6726. The average polymerization degree of the polyvinyl alcohol can be 1,500 or more and 5,000 or less, and is preferably 2,000 or more and 5,000 or less. The average polymerization degree mentioned herein is a value measured by the method specified in JIS K 6726.

For preparing the ink receiving layer coating liquid, it is desirable to use the polyvinyl alcohol or its derivative in the form of aqueous solution. In this instance, the content of polyvinyl alcohol and polyvinyl alcohol derivatives of the aqueous solution is preferably 3% by mass or more and 20% by mass or less.

Also, in the first ink receiving layer, the mass ratio of the first binder to the first inorganic particles is 0.13 or more and 0.33 or less, as described above. Preferably, it is 0.15 or more and 0.28 or less.

(3) Crosslinking Agent

The first ink receiving layer may contain a crosslinking agent. Examples of the crosslinking agent include aldehyde compounds, melamine compounds, isocyanate compounds, zirconium compounds, amide-based compounds, aluminum-based compounds, and boric compounds and their salts. These crosslinking agents may be used singly or in combination. In particular, when polyvinyl alcohol or its derivative is used as the binder, a boric compound or a salt thereof is advantageously used.

Boric compounds include orthoboric acid ($H_3BO_3$), metaboric acid (($HBO_2)_n$), and hypoboric acid ($H_4B_2O_4$). The salt of the boric compound can be a water-soluble salt of any of the above-mentioned oxoacids. Examples of the salt of the boric compound include alkali metal salts, such as sodium orthoborate and potassium orthoborate; alkaline-earth metal salts, such as magnesium orthoborate and calcium orthoborate; and ammonium salts. Among these compounds, orthoboric acid is advantageous from the viewpoint of the temporal stability of the coating liquid and the effect of preventing the occurrence of cracks.

The amount of the crosslinking agent to be used can be appropriately controlled according to the manufacturing conditions and other factors. The mass ratio of the crosslinking agent to the first binder in the first ink receiving layer can be 0.01 or more and 0.1 or less.

(4) Other Additives

The first ink receiving layer may further contain other additives. Examples of such additives include a pH adjuster, a thickener, a fluidity improving agent, an antifoaming agent, a foam suppressor, a surfactant, a release agent, a penetrant, a coloring pigment, a coloring dye, a fluorescent brightening agent, an ultraviolet absorbent, an antioxidant, a preservative, a fungicide, a water resistant additive, a dye fixing agent, a curing agent, and a weather-resistant material.

Second Ink Receiving Layer (1) Inorganic Particles

The second ink receiving layer contains inorganic particles (second inorganic particles). Particles used in the second ink receiving layer include particles of titanium dioxide, zeolite, kaolin, talc, hydrotalcite, zinc oxide, zinc hydroxide, aluminum silicate, calcium silicate, magnesium silicate, zirconium oxide and zirconium hydroxide, in addition to alumina particles and silica particles. These types of inorganic particles may be used singly or in combination.

In an embodiment of the present invention, alumina particles or silica particles, which have a highly porous structure that can absorb ink, can be advantageously used as the inorganic particles of the second ink receiving layer. The physical properties of the second inorganic particles can be the same as the first inorganic particles, except for those described below.

If the second inorganic particles include both silica particles and alumina particles, the ratio of the silica particles to the alumina particles can be in the range of 0:100 to 20:80 or in the range of 80:20 to 100:0.

The second inorganic particle content of the second ink receiving layer can be 55% by mass or more and 98% by mass or less, and is preferably 65% by mass or more and 96% by mass or less.

The amount of the second inorganic particles applied for forming the second ink receiving layer is preferably 2 g/m² or more and 10 g/m² or less. By applying such an amount of the second inorganic particles, a suitable thickness can be easily given to the second ink receiving layer.

(2) Binder

The second ink receiving layer contains a binder (second binder). The binders that can be used in the first ink receiving layer can be used as the second binder. The physical properties of the second binder are the same as the first binder, except for those described below.

In the second ink receiving layer, the mass ratio of the second binder to the second inorganic particles is 0.05 or more and 0.30 or less, as described above. If the second inorganic particles are composed of alumina particles, the mass ratio of the second binder to the alumina particles can be 0.05 or more and 0.10 or less. If the second inorganic particles are composed of silica particles, the mass ratio of the second binder to the silica particles can be 0.15 or more and 0.30 or less.

(3) Crosslinking Agent

The second ink receiving layer may contain a crosslinking agent. The crosslinking agents that can be used in the first ink receiving layer can be used in the second ink receiving layer.

The amount of the crosslinking agent to be used can be appropriately controlled according to the manufacturing conditions and other factors. The mass ratio of the crosslinking agent to the second binder in the second ink receiving layer can be 0.05 or more and 0.30 or less.

(4) Other Additives

The second ink receiving layer may further contain other additives. More specifically, the additives mentioned as those that can be used in the first ink receiving layer can also be used in the second ink receiving layer.

Method for Manufacturing Recording Medium

Although the recording medium of the present embodiment can be manufactured by any method without particular limitation, the method for manufacturing the recording medium can include preparing ink receiving layer coating liquids, and applying the ink receiving layer coating liquids to the substrate. The method for manufacturing the recording medium will now be described.

Preparation of Substrate

The base paper of the substrate can be prepared by an ordinary paper making process. Exemplary paper-making machines include a Fourdrinier machine, a cylinder machine, a drum machine, and a twin wire machine. The base paper may be subjected to surface treatment to enhance the smoothness of the surface by applying heat and pressure during or after paper making. The surface treatment may be performed by calendaring, such as machine calendering or super calendering.

For forming a resin layer over the base paper, that is, for coating the base paper with a resin, melt extrusion, wet lamination or dry lamination may be applied. Melt extrusion, in which the base paper is coated by extruding a molten resin onto either or both sides of the base paper, is advantageous. For example, a method called extrusion coating is widely used in which a transported base paper and a resin sheet extruded from an extrusion die are brought into contact with each other at a nip point between a nip roller and a cooling roller and pressed with the nip so that the base paper is coated with the resin. If a resin layer is formed by melt extrusion, pretreatment may be performed to increase the adhesion between the base paper and the resin layer. The pretreatment may be performed by acid etching with a mixed solution of sulfuric acid and chromic acid, gas flame treatment, UV exposure, corona discharge, glow discharge, or alkyl coating or other anchor coating. Among these pretreatment techniques, corona discharge treatment is advantageous.

Formation of Ink Receiving Layers

The ink receiving layers may be formed on the substrate by the following procedure. First, an ink receiving layer coating liquid is prepared. Then, the coating liquid is applied to the substrate and is then dried to yield the recording medium. In an embodiment, a first ink receiving layer coating liquid and a second in receiving layer coating liquid are prepared. The first ink receiving layer coating liquid may be first applied to the substrate, followed by drying, and then the second ink receiving layer coating liquid is applied. Alternatively, the two ink receiving layer coating liquids may be applied at one time by a simultaneous multilayer coating technique. In particular, slide bead coating, slide curtain coating and other coating methods capable of simultaneous multilayer coating are highly productive and are therefore advantageous. The coating liquids may be heated for being applied. For drying the coating layer, a hot air dryer may be used, such as a linear tunnel dryer, an arch dryer, an air loop dryer, or a sine curve air flow dryer, or any other dryer may be used, such as IR dryer, heating dryer, or microwave dryer.

EXAMPLES

The present invention will be further described in detail with reference to Examples and Comparative Examples. However, the invention is not limited to the following Examples within the scope and spirit of the invention. In the following Examples, "part(s)" are on a mass basis unless otherwise specified.

Preparation of Recording Media
Preparation of Substrate

A paper stock was prepared by mixing 80.00 parts of LBKP having a Canadian standard freeness of 450 mL, 20.00 parts of NBKP having a Canadian standard freeness of 480 mL, 0.60 part of cationized starch, 10.00 parts of ground calcium carbonate, 15.00 parts of precipitated calcium carbonate, 0.10 part of alkylketene dimer, and 0.03 part of cationic polyacrylamide, and adding water to the mixture so as to have a solid content of 3.0% by mass. Subsequently, paper making using the paper stock was performed with a Fourdrinier machine, followed by three-step wet press and drying with a multicylinder dryer. Then, the obtained sheet was soaked with an aqueous solution of oxidized starch and dried so that the solid content after drying with a size press machine would be 1.0 g/m². The sheet was then finished by machine calendering to yield a 100 μm thick base paper having a basis weight of 170 g/m², a Stöckigt sizing degree of 100 s, an air permeance of 50 s, a Bekk smoothness of 30 s, and a Gurley stiffness of 11.0 mN. Subsequently, a resin composition containing 70 parts of a low-density polyethylene, 20 parts of a high-density polyethylene and 10 parts of titanium oxide was applied onto one side of the base paper so that the amount of the coating would be 25 g/m² after being dried. The side of the base paper coated with this resin composition was used as the upper side. Subsequently, a resin composition containing 50 parts of a low-density polyethylene and 50 parts of a high-density polyethylene was applied onto the other side of the base paper so that the amount of the coating would be 25 g/m² after being dried, and thus a substrate was completed.

Preparation of Recording Media
(1) Preparation of Inorganic Particle Dispersion Liquids Inorganic Particle Dispersion Liquid A Hydrated alumina DISPERAL HP 14 (produced by Sasol) was added to ion exchanged water so that the solid content would be 30% by mass. Subsequently, 1.4 parts of methanesulfonic acid was added relative to 100 parts of the solid of the hydrated alumina, and ion exchanged water was further added in an amount to give a hydrated alumina solid content of 27% by mass to yield inorganic particle dispersion liquid A.

Inorganic Particle Dispersion Liquid B

Fumed silica EROSIL 300 (produced by EVONIK) was added to ion exchanged water so that the solid content would be 22% by mass. Subsequently, 5% by mass of cationic polymer SHALLOL DC 902P (produced by Dai-ichi Kogyo Seiyaku) was added to the liquid of the fumed silica, followed by stirring. Then, ion exchanged water was further added in an mount to give a silica solid content of 18% by mass to yield inorganic particle dispersion liquid B.

Inorganic Particle Dispersion Liquid C

Gas phase alumina AEROXIDE Alu C (produce by EVONIK) was added to ion exchanged water so that the solid content would be 26% by mass. Subsequently, 1.5 parts of methanesulfonic acid was added relative to 100 parts of the solid of the hydrated alumina, and ion exchanged water was further added in an amount to give a hydrated alumina solid content of 23% by mass to yield inorganic particle dispersion liquid C.

Inorganic Particle Dispersion Liquid D

Colloidal silica SNOWTEX AK-L (produced by Nissan Chemical Industries) was added to ion exchanged water so that the solid content of the colloidal silica would be 20% by mass, and thus inorganic particle dispersion liquid D was prepared.

(2) Preparation of First Ink Receiving Layer Coating Liquids

The inorganic particle dispersion liquids prepared above were mixed to prepare first inorganic particle dispersion liquid mixtures, each having a ratio of alumina particles to silica particles shown in Table 1. Subsequently, any of the obtained inorganic particle dispersion liquid mixtures, an aqueous solution of polyvinyl alcohol (aqueous solution of 8% by mass of PVA 235 (produced by Kuraray, polymerization degree: 3,500, saponification degree: 88 mol %) and an aqueous solution of boric acid (boric acid content: 3% by mass) were mixed in the proportion shown in Table 1. Thus, first ink receiving layer coating liquids were prepared.

TABLE 1

Compositions of First Ink Receiving Layer Coating Liquids

| | First inorganic particles | | | | | | | | Proportion | | |
| | Alumina particles | | | Silica particles | | | | | First binder | Alumina | Cross-linking |
| Coating liquid No. | Inorganic particle dispersion liquid | Material of inorganic particles | Inorganic particle solid content (part) | Inorganic particle dispersion liquid | Material of inorganic particles | Inorganic particle solid content (part) | First Binder Polyvinyl alcohol (part) | Crosslinking agent Boric acid (part) | content/ First inorganic particle content | particle Content/ Silica particle content | agent content/ First binder content |
|---|---|---|---|---|---|---|---|---|---|---|---|
| Coating liquid 1-1 | Inorganic particle dispersion liquid A | Hydrated alumina | 50.0 | Inorganic particle dispersion liquid B | Fumed silica | 50.0 | 20.0 | 1.0 | 0.20 | 1.00 | 0.05 |
| Coating liquid 1-2 | Inorganic particle dispersion liquid A | Hydrated alumina | 50.0 | Inorganic particle dispersion liquid B | Fumed silica | 50.0 | 13.0 | 0.7 | 0.13 | 1.00 | 0.05 |

TABLE 1-continued

Compositions of First Ink Receiving Layer Coating Liquids

| | First inorganic particles | | | | | | | | Proportion | | |
| | Alumina particles | | | Silica particles | | | | | First binder content/ First inorganic particle content | Alumina particle Content/ Silica particle content | Cross-linking agent content/ First binder content |
| Coating liquid No. | Inorganic particle dispersion liquid | Material of inorganic particles | Inorganic particle solid content (part) | Inorganic particle dispersion liquid | Material of inorganic particles | Inorganic particle solid content (part) | First Binder Polyvinyl alcohol (part) | Crosslinking agent Boric acid (part) | | | |
|---|---|---|---|---|---|---|---|---|---|---|---|
| Coating liquid 1-3 | Inorganic particle dispersion liquid A | Hydrated alumina | 50.0 | Inorganic particle dispersion liquid B | Fumed silica | 50.0 | 33.0 | 1.5 | 0.33 | 1.00 | 0.05 |
| Coating liquid 1-4 | Inorganic particle dispersion liquid A | Hydrated alumina | 40.0 | Inorganic particle dispersion liquid B | Fumed silica | 60.0 | 20.0 | 1.0 | 0.20 | 0.67 | 0.05 |
| Coating liquid 1-5 | Inorganic particle dispersion liquid A | Hydrated alumina | 60.0 | Inorganic particle dispersion liquid B | Fumed silica | 40.0 | 20.0 | 1.0 | 0.20 | 1.50 | 0.05 |
| Coating liquid 1-6 | Inorganic particle dispersion liquid A | Hydrated alumina | 30.0 | Inorganic particle dispersion liquid B | Fumed silica | 70.0 | 20.0 | 1.0 | 0.20 | 0.43 | 0.05 |
| Coating liquid 1-7 | Inorganic particle dispersion liquid A | Hydrated alumina | 70.0 | Inorganic particle dispersion liquid B | Fumed silica | 30.0 | 20.0 | 1.0 | 0.20 | 2.33 | 0.05 |
| Coating liquid 1-8 | Inorganic particle dispersion liquid A | Hydrated alumina | 50.0 | Inorganic particle dispersion liquid B | Fumed silica | 50.0 | 20.0 | 3.0 | 0.20 | 1.00 | 0.15 |
| Coating liquid 1-9 | Inorganic particle dispersion liquid A | Hydrated alumina | 50.0 | Inorganic particle dispersion liquid B | Fumed silica | 50.0 | 20.0 | 2.0 | 0.20 | 1.00 | 0.10 |
| Coating liquid 1-10 | Inorganic particle dispersion liquid C | Fumed alumina | 50.0 | Inorganic particle dispersion liquid B | Fumed silica | 50.0 | 20.0 | 1.0 | 0.20 | 1.00 | 0.05 |
| Coating liquid 1-11 | Inorganic particle dispersion liquid A | Hydrated alumina | 50.0 | Inorganic particle dispersion liquid B | Fumed silica | 50.0 | 10.0 | 0.5 | 0.10 | 1.00 | 0.05 |
| Coating liquid 1-12 | Inorganic particle dispersion liquid A | Hydrated alumina | 50.0 | Inorganic particle dispersion liquid B | Fumed silica | 50.0 | 35.0 | 1.8 | 0.35 | 1.00 | 0.05 |
| Coating liquid 1-13 | Inorganic particle dispersion liquid A | Hydrated alumina | 20.0 | Inorganic particle dispersion liquid B | Fumed silica | 80.0 | 20.0 | 1.0 | 0.20 | 0.25 | 0.05 |
| Coating liquid 1-14 | Inorganic particle dispersion liquid A | Hydrated alumina | 80.0 | Inorganic particle dispersion liquid B | Fumed silica | 20.0 | 20.0 | 1.0 | 0.20 | 4.00 | 0.05 |
| Coating liquid 1-15 | Inorganic particle dispersion liquid A | Hydrated alumina | 100.0 | — | — | 0 | 9.0 | 0.5 | 0.09 | — | 0.05 |
| Coating liquid 1-16 | Inorganic particle dispersion liquid A | Hydrated alumina | 100.0 | — | — | 0 | 20.0 | 1.0 | 0.20 | — | 0.05 |
| Coating liquid 1-17 | — | — | 0 | Inorganic particle dispersion liquid B | Fumed silica | 100.0 | 20.0 | 1.0 | 0.20 | — | 0.05 |

(3) Preparation of Second Ink Receiving Layer Coating Liquids

A second inorganic particle dispersion liquid, which was selected from the inorganic particle dispersion liquid prepared above, an aqueous solution of polyvinyl alcohol (aqueous solution of 8% by mass of PVA 235 (produced by Kuraray, polymerization degree: 3,500, saponification degree: 88 mol %) and an aqueous solution of boric acid (boric acid content: 3% by mass) were mixed in the proportion shown in Table 2 to yield a second ink receiving layer coating liquid.

TABLE 2

Compositions of Second Ink Receiving Layer Coating Liquids

| | Second inorganic particles | | | | | | | | proportion | |
| | Alumina particles | | | Silica particles | | | Deflocculating acid Methanesulfonic acid (Part) | Second binder Polyvinyl alcohol (part) | Crosslinking agent Boric acid (part) | Second binder content/ Second inorganic particle content | Crosslinking agent content/ Second binder content |
| Coating liquid No. | Inorganic particle dispersion liquid | Material of inorganic particles | Inorganic particle solid content (part) | Inorganic particle dispersion liquid | Material of inorganic particles | Inorganic particle solid content (part) | | | | | |
|---|---|---|---|---|---|---|---|---|---|---|---|
| Coating liquid 2-1 | Inorganic particle dispersion liquid A | Hydrated alumina | 100 | — | — | 0 | 1.3 | 7 | 1.15 | 0.07 | 0.16 |
| Coating liquid 2-2 | Inorganic particle dispersion liquid A | Hydrated alumina | 100 | — | — | 0 | 1.3 | 5 | 0.96 | 0.05 | 0.19 |
| Coating liquid 2-3 | — | — | 0 | Inorganic particle dispersion liquid B | Fumed silica | 100 | 0 | 10 | 1.76 | 0.30 | 0.18 |
| Coating liquid 2-4 | Inorganic particle dispersion liquid C | Fumed alumina | 100 | — | — | 0 | 1.3 | 7 | 1.15 | 0.07 | 0.16 |
| Coating liquid 2-5 | — | — | 0 | Inorganic particle dispersion liquid B | Fumed silica | 100 | 0 | 20 | 4.00 | 0.20 | 0.20 |
| Coating liquid 2-6 | Inorganic particle dispersion liquid A | Hydrated alumina | 80 | Inorganic particle dispersion liquid B | Fumed silica | 20 | 1 | 10 | 2.00 | 0.10 | 0.20 |
| Coating liquid 2-7 | Inorganic particle dispersion liquid A | Hydrated alumina | 70 | Inorganic particle dispersion liquid B | Fumed silica | 30 | 0.9 | 10 | 2.00 | 0.10 | 0.20 |
| Coating liquid 2-8 | Inorganic particle dispersion liquid A | Hydrated alumina | 100 | — | — | 0 | 1.3 | 4 | 0.80 | 0.04 | 0.20 |
| Coating liquid 2-9 | — | — | 0 | Inorganic particle dispersion liquid B | Fumed silica | 100 | 0 | 12 | 1.92 | 0.35 | 0.16 |

(4) Preparation of Recording Media
Recording Media 1 to 38

Any of the first ink receiving layer coating liquids of 40° C. in temperature and any of second ink receiving layer coating liquids of 40° C. in temperature were simultaneously applied onto the substrate prepared above with a slide die so that the first ink receiving layer and the second ink receiving layer could be formed in that order. The obtained sheet was dried with 40° C. warm air to yield a recording medium.

This application was performed so that each coating or layer could have the thickness shown in Table 3. The ink receiving layer of Recording Medium 24 was cracked. Since a desired recording medium was thus not prepared, Recording Medium 24 was not evaluated in the evaluations described below.

TABLE 3

Conditions of Recording Media

| Recording medium No. | First ink receiving layer Coating liquid No. | Thickness (μm) | Second ink receiving layer Coating liquid No. | Thickness (μm) | Total thickness of ink receiving layers (μm) | Second ink receiving layer thickness/ First ink receiving layer thickness |
|---|---|---|---|---|---|---|
| Recording medium 1 | Coating liquid 1-1 | 13 | Coating liquid 2-1 | 2 | 15 | 0.15 |
| Recording medium 2 | Coating liquid 1-1 | 15 | Coating liquid 2-1 | 5 | 20 | 0.33 |
| Recording medium 3 | Coating liquid 1-1 | 20 | Coating liquid 2-1 | 10 | 30 | 0.50 |
| Recording medium 4 | Coating liquid 1-1 | 15 | Coating liquid 2-2 | 5 | 20 | 0.33 |
| Recording medium 5 | Coating liquid 1-1 | 15 | Coating liquid 2-3 | 5 | 20 | 0.33 |
| Recording medium 6 | Coating liquid 1-2 | 15 | Coating liquid 2-1 | 5 | 20 | 0.33 |
| Recording medium 7 | Coating liquid 1-3 | 15 | Coating liquid 2-1 | 5 | 20 | 0.33 |
| Recording medium 8 | Coating liquid 1-1 | 10 | Coating liquid 2-1 | 10 | 20 | 1.00 |
| Recording medium 9 | Coating liquid 1-1 | 8 | Coating liquid 2-1 | 2 | 10 | 0.25 |
| Recording medium 10 | Coating liquid 1-4 | 15 | Coating liquid 2-1 | 5 | 20 | 0.33 |
| Recording medium 11 | Coating liquid 1-5 | 15 | Coating liquid 2-1 | 5 | 20 | 0.33 |
| Recording medium 12 | Coating liquid 1-6 | 15 | Coating liquid 2-1 | 5 | 20 | 0.33 |
| Recording medium 13 | Coating liquid 1-7 | 15 | Coating liquid 2-1 | 5 | 20 | 0.33 |
| Recording medium 14 | Coating liquid 1-8 | 15 | Coating liquid 2-1 | 5 | 20 | 0.33 |
| Recording medium 15 | Coating liquid 1-9 | 6 | Coating liquid 2-1 | 8 | 14 | 1.33 |
| Recording medium 16 | Coating liquid 1-1 | 4 | Coating liquid 2-1 | 10 | 14 | 2.50 |
| Recording medium 17 | Coating liquid 1-10 | 15 | Coating liquid 2-1 | 5 | 20 | 0.33 |
| Recording medium 18 | Coating liquid 1-1 | 15 | Coating liquid 2-4 | 5 | 20 | 0.33 |
| Recording medium 19 | Coating liquid 1-1 | 15 | Coating liquid 2-5 | 5 | 20 | 0.33 |
| Recording medium 20 | Coating liquid 1-1 | 15 | Coating liquid 2-6 | 5 | 20 | 0.33 |
| Recording medium 21 | Coating liquid 1-1 | 15 | Coating liquid 2-7 | 5 | 20 | 0.33 |
| Recording medium 22 | Coating liquid 1-1 | 6 | Coating liquid 2-1 | 2 | 8 | 0.33 |
| Recording medium 23 | Coating liquid 1-1 | 30 | Coating liquid 2-1 | 5 | 35 | 0.17 |
| Recording medium 24 | Coating liquid 1-1 | 15 | Coating liquid 2-8 | 5 | 20 | 0.33 |
| Recording medium 25 | Coating liquid 1-1 | 15 | Coating liquid 2-9 | 5 | 20 | 0.33 |
| Recording medium 26 | Coating liquid 1-11 | 15 | Coating liquid 2-1 | 5 | 20 | 0.33 |
| Recording medium 27 | Coating liquid 1-12 | 15 | Coating liquid 2-1 | 5 | 20 | 0.33 |
| Recording medium 28 | Coating liquid 1-1 | 8 | Coating liquid 2-1 | 12 | 20 | 1.50 |
| Recording medium 29 | Coating liquid 1-1 | 19 | Coating liquid 2-1 | 1 | 20 | 0.05 |

TABLE 3-continued

Conditions of Recording Media

| Recording medium No. | First ink receiving layer Coating liquid No. | First ink receiving layer Thickness (μm) | Second ink receiving layer Coating liquid No. | Second ink receiving layer Thickness (μm) | Total thickness of ink receiving layers (μm) | Second ink receiving layer thickness/First ink receiving layer thickness |
|---|---|---|---|---|---|---|
| Recording medium 30 | Coating liquid 1-13 | 15 | Coating liquid 2-1 | 5 | 20 | 0.33 |
| Recording medium 31 | Coating liquid 1-14 | 15 | Coating liquid 2-1 | 5 | 20 | 0.33 |
| Recording medium 32 | Coating liquid 1-15 | 15 | Coating liquid 2-1 | 5 | 20 | 0.33 |
| Recording medium 33 | Coating liquid 1-16 | 15 | Coating liquid 2-1 | 5 | 20 | 0.33 |
| Recording medium 34 | Coating liquid 1-17 | 15 | Coating liquid 2-1 | 5 | 20 | 0.33 |
| Recording medium 35 | — | 0 | Coating liquid 2-1 | 20 | 20 | — |
| Recording medium 36 | Coating liquid 1-1 | 20 | — | 0 | 20 | — |
| Recording medium 37 | Coating liquid 1-16 | 20 | — | 0 | 20 | — |
| Recording medium 38 | Coating liquid 1-17 | 20 | — | 0 | 20 | — |

Recording Medium 39

Recording Medium 39 was prepared with reference to Example 8 disclosed in Japanese Patent Laid-Open No. 2008-183807.

Recording Medium 40

Recording Medium 40 was prepared with reference to Example 4 disclosed in Japanese Patent Laid-Open No. 2005-104028.

Evaluations

In each evaluation, A and B represent that the results were in a good level, and C represents that the results were in an unacceptable level. For recording an image for the following evaluations, an ink jet recording apparatus PIXUS MP 990 (manufactured by CANON KABUSHIKI KAISHA) with an ink cartridge BCI-321 (manufactured by CANON KABUSHIKI KAISHA) was used. The recording was performed at a temperature of 23° C. and a relative humidity of 50%. In the use of the ink jet recording apparatus, the duty of recording performed in such a manner that an ink droplet of about 11 ng is applied to a unit area of 1/600 inch×1/600 inch at a resolution of 600 dpi×600 dpi is defined as 100%.

Fold Crack Resistance

A black solid pattern was formed on each of the recording media prepared above at a recording duty of 200% using the above-mentioned ink jet recording apparatus. The recording medium was folded into two with the solid pattern inside, and pressed at a load of 500 kg for 5 minutes with a press machine to make a fold line. The recording medium was repeatedly opened and closed 20 times at the fold line, and then the fold crack resistance was evaluated by visually observing the fold line. Evaluation results are shown in Table 4.

A: White lines were hardly observed at the fold line.
B: White lines were observed to some extent at the fold line, but were nearly invisible.
C: Clear white lines were observed at the fold line.

Ink Absorbency

A green solid pattern was formed on each of the recording media prepared above at a recording duty of 300% using the above-mentioned ink jet recording apparatus. The ink absorbency of the recording media was evaluated by visually observing the green solid pattern. The evaluation criteria were as follows, and evaluation results are shown in Table 4.

A: Color unevenness was hardly observed in the pattern.
B: Color unevenness was observed to some extent, but was nearly invisible.
C: Color unevenness was clearly observed.

Color Developability of Image

A black solid pattern was formed on each of the recording media prepared above at a recording duty of 200% using the above-mentioned ink jet recording apparatus. The color developability was evaluated by measuring the optical density of the solid pattern with an optical reflection densitometer (530 spectro-densitometer, manufactured by X-Rite). The evaluation criteria were as follows, and evaluation results are shown in Table 4.

A: Optical density ≥2.1
B: 1.9≤optical density <2.1
C: Optical density <1.9

TABLE 4

Evaluation Results

| Example No. | Recording medium No. | Fold crack resistance | Ink absorbency | Color developability of image |
|---|---|---|---|---|
| Example 1 | Recording medium 1 | A | A | A |
| Example 2 | Recording medium 2 | A | A | A |
| Example 3 | Recording medium 3 | B | A | A |
| Example 4 | Recording medium 4 | A | A | A |
| Example 5 | Recording medium 5 | A | A | A |

TABLE 4-continued

Evaluation Results

| Example No. | Recording medium No. | Fold crack resistance | Ink absorbency | Color developability of image |
|---|---|---|---|---|
| Example 6 | Recording medium 6 | A | A | A |
| Example 7 | Recording medium 7 | A | A | A |
| Example 8 | Recording medium 8 | A | A | A |
| Example 9 | Recording medium 9 | A | A | A |
| Example 10 | Recording medium 10 | A | A | A |
| Example 11 | Recording medium 11 | A | A | A |
| Example 12 | Recording medium 12 | B | A | A |
| Example 13 | Recording medium 13 | B | A | A |
| Example 14 | Recording medium 14 | B | A | A |
| Example 15 | Recording medium 15 | A | A | A |
| Example 16 | Recording medium 16 | B | A | A |
| Example 17 | Recording medium 17 | A | A | A |
| Example 18 | Recording medium 18 | A | A | A |
| Example 19 | Recording medium 19 | A | A | A |
| Example 20 | Recording medium 20 | A | A | B |
| Example 21 | Recording medium 21 | A | A | B |
| Comparative Example 1 | Recording medium 22 | A | C | C |
| Comparative Example 2 | Recording medium 23 | C | A | B |
| Comparative Example 3 | Recording medium 24 | — | — | — |
| Comparative Example 4 | Recording medium 25 | A | C | B |
| Comparative Example 5 | Recording medium 26 | C | A | A |
| Comparative Example 6 | Recording medium 27 | A | C | B |
| Comparative Example 7 | Recording medium 28 | C | A | A |
| Comparative Example 8 | Recording medium 29 | A | C | C |
| Comparative Example 9 | Recording medium 30 | C | A | B |
| Comparative Example 10 | Recording medium 31 | C | B | A |
| Comparative Example 11 | Recording medium 32 | C | A | A |
| Comparative Example 12 | Recording medium 33 | C | C | B |
| Comparative Example 13 | Recording medium 34 | C | A | C |
| Comparative Example 14 | Recording medium 35 | C | A | A |
| Comparative Example 15 | Recording medium 36 | A | C | C |
| Comparative Example 16 | Recording medium 37 | B | C | C |
| Comparative Example 17 | Recording medium 38 | B | C | C |
| Comparative Example 18 | Recording medium 39 | C | A | A |
| Comparative Example 19 | Recording medium 40 | C | A | B |

Although both Examples 20 and 21 were evaluated as B in terms of the color developability of the image, the color developability of Example 20 was considered to be higher than that of Example 21 because the optical density of Example 20 was slightly higher than that of Example 21.

The recording medium of an embodiment of the present invention can exhibit a satisfactory ink absorbency and fold crack resistance, and the image on the recording medium exhibits high color developability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-030121 filed Feb. 19, 2013, which is hereby incorporated by reference herein in its entirety.

What is claimed is:

1. A recording medium comprising:
   a substrate; and
   ink receiving layers including a first ink receiving layer disposed on the substrate and a second ink receiving layer disposed on the first ink receiving layer, the first ink receiving layer containing first inorganic particles including alumina particles and silica particles and a first binder in such proportions that the mass ratio of the binder to the first inorganic particles is 0.13 or more and 0.33 or less, and that the mass ratio of the alumina particles to the silica particles is 0.43 or more and 2.33 or less, the second ink receiving layer containing second inorganic particles and a second binder in such a proportion that the mass ratio of the second binder to the second inorganic particles is 0.05 or more and 0.30 or less, the second ink receiving layer having a thickness of 2 μm or more and 10 μm or less, the ink receiving layers having a total thickness of 10 μm or more and 30 μm or less.

2. The recording medium according to claim 1, wherein the mass ratio of the alumina particles to the silica particles is 0.67 or more and 1.50 or less in the first ink receiving layer.

3. The recording medium according to claim 1, wherein the first ink receiving layer further contains a crosslinking agent, and the mass ratio of the crosslinking agent to the first binder is 0.01 or more and 0.10 or less.

4. The recording medium according to claim 1, wherein the second ink receiving layer has a thickness twice or less the thickness of the first ink receiving layer.

* * * * *